United States Patent [19]

Christopher

[11] 4,306,613

[45] Dec. 22, 1981

[54] PASSIVE COOLING SYSTEM

[76] Inventor: Nicholas S. Christopher, 56 Page Farm Rd., Sherborn, Mass. 01748

[21] Appl. No.: 128,573

[22] Filed: Mar. 10, 1980

[51] Int. Cl.³ .......................................... F28D 15/00
[52] U.S. Cl. ........................................ 165/32; 62/3; 165/104.14; 165/10; 165/104.21; 165/104.33; 165/104.34
[58] Field of Search ...................... 165/104.17, 104.21, 165/104.33, 32, 104.14, 104.34, 10; 62/3; 361/383, 385

[56] References Cited

U.S. PATENT DOCUMENTS

| | | | |
|---|---|---|---|
| 1,945,975 | 2/1934 | Munters | 165/104.21 X |
| 2,499,736 | 3/1950 | Kleen | 62/333 X |
| 2,825,034 | 2/1958 | Birchard | 165/104.17 X |
| 3,785,365 | 1/1974 | Laing et al. | 165/104.33 X |
| 4,073,284 | 2/1978 | Laing | 165/104.26 X |
| 4,263,963 | 4/1981 | Ghiraldi | 165/104.33 X |

Primary Examiner—Albert W. Davis
Attorney, Agent, or Firm—Daniel Jay Tick

[57] ABSTRACT

A cold bank tank in an enclosure for storing thermal energy in a very small area contains a liquid heat transfer fluid and has a top which is the top of the enclosure and a spaced opposite bottom. An inside heat exchanger extends from the bottom of the tank in the enclosure for cooling warm air in the enclosure rising by natural convection, returning the cooled air to the enclosure and transferring the warm air to the tank wherein it warms the fluid in the tank. An outside heat exchanger outside the enclosure is spaced from the top of the enclosure and coupled to the tank. A plurality of energy storage rods in the fluid in the tank store thermal energy in a very small area. The heat warming the fluid is transferred to the energy storage rods and when the outside temperature decreases below a predetermined magnitude, heat is released from the rods to the liquid fluid and vaporizes the fluid. The vaporized fluid flows upward through piping to the outside horizontal heat exchanger, through the outside heat exchanger, whence its heat is dissipated in the cooler outside air, and the vapor is recondensed and returns by gravity force to the tank via piping thereby storing cold energy in the rods for release when the air in the enclosure is next warmed.

3 Claims, 1 Drawing Figure

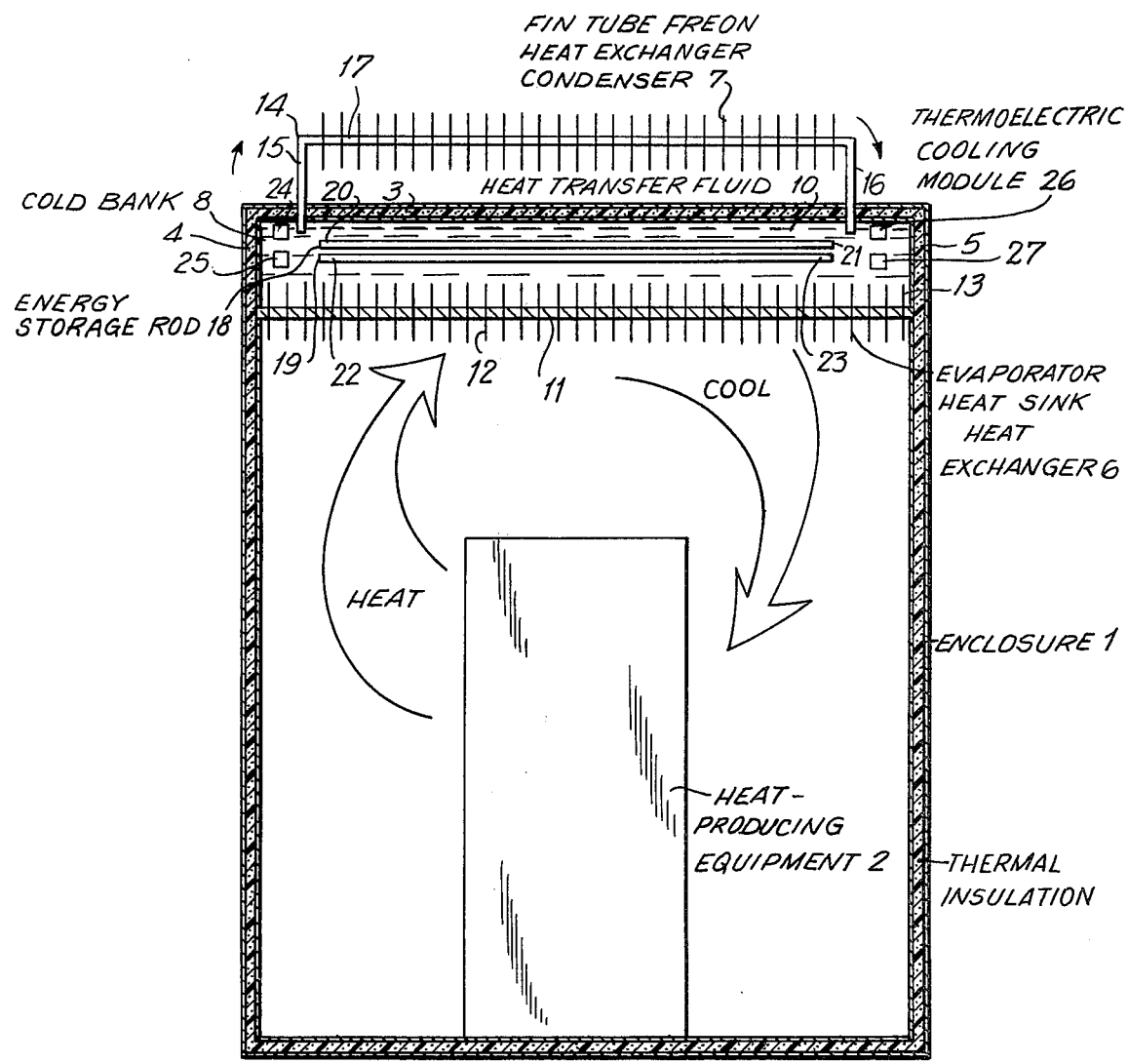

PASSIVE COOLING SYSTEM

BACKGROUND OF THE INVENTION

The present invention relates to a passive cooling system. More particularly, the invention relates to a solid state passive cooling system for cooling an enclosure sheltering heat-producing equipment such as, for example, a microwave repeater station.

Heat-producing equipment such as, for example, remote microwave repeater stations, are frequently subjected to very high ambient temperatures which may have a severe adverse affect on the life, reliability and performance of the equipment. Accordingly, conventional air conditioners have been used heretofore to reduce the temperature of the equipment enclosure below the maximum specified by the equipment manufacturer. The maximum specified temperature is typically 104° F. or 40° C.

A disadvantage of conventional air conditioners, however, is that they consume large amounts of electrical energy, from 800 to 1,500 watts, which energy is produced by large engine generator sets. The power required to run a conventional air conditioner is generally two or three times higher than the power required for the equipment. Thus, considerably larger volumes of expensive fuel are consumed in producing the energy than would be required with the passive cooling system of the invention.

Several passive cooling systems are currently being used to solve the aforedescribed problem. However, these systems utilize very large inside and outside heat exchangers as well as very large thermal storage tanks, since water or a water base solution is used as the thermal storage medium. The water base passive system is so inefficient in thermal storage and thermal transfer characteristics, operating on the thermosiphon process, that the prior art passive cooling systems are almost as large as the equipment enclosure itself. Furthermore, the passive cooling systems of the prior art are limited to desert applications, where nighttime temperatures drop sufficiently to permit the thermal storage water base solution to drop sufficiently in temperature to permit cooling during the following daytime period.

Passive cooling systems are described in a paper entitled "Standard Long-Range Operating Stations in Shelters With Integrated Thermal-Syphon System" by Franz Schmalzl of Siemens AG, Munich, Germany, presented at the 1979 International Telecommunications Energy Conference and appearing in the proceedings, 79CH1502-4, a brochure of Siemens Aktiengesellschaft, describing "Standard Long-Range Operating Station In Shelter Design With Integrated Systems For Temperature Control And Primary Power Sources", a Data Sheet of Ormat Systems Inc., N. S. Christopher, Inventor, for "Desert Microwave Repeater Cooling System", Technical Bulletin No. 052 of Ormat Systems Inc., March 1979, N. S. Christopher, Inventor, for "The Ormat Energy Converter and High Reliability Temperature Conditioning Equipment for Typical Telecommunications Systems Applications", Technical Bulletin No. 142 of Ormat Systems Inc., December 1979, for "Ormat Passive Cooling System for Radio Equipment Shelter" and Technical Bulletin No. 133 of Ormat Systems, Inc., for "Microwave Repeater Cooling Systems".

The cost of manufacture of the prior art passive cooling systems is very high, because they require large tanks and large heat exchangers, as well as large volumes of water base solutions which are difficult to transport to remote sites.

The principal object of the invention is to provide a passive cooling system which functions efficiently, effectively, reliably and economically to maintain a cool environment for enclosed heat-producing equipment.

An object of the invention is to provide a passive cooling system which functions efficiently, effectively and reliably to cool enclosed heat-producing equipment without consuming energy, except under extreme conditions.

Another object of the invention is to provide a passive cooling system which utilizes only solid state components and has no moving parts.

Still another object of the invention is to provide a passive cooling system of considerably smaller dimensions than known systems for cooling enclosed heat-producing equipment.

Yet another object of the invention is to provide a passive cooling system of simple structure, which is inexpensive in manufacture and operation, and functions efficiently, effectively and reliably to maintain a cool environment for enclosed heat-producing equipment.

An object of the invention is to provide a passive cooling system having considerably smaller dimensions and being considerably more aesthetically attractive than known systems for cooling enclosed heat-producing equipment, and being of simpler structure and less expensive in manufacture than such known systems.

Another object of the invention is to provide a passive cooling system which maintains a cooler environment for enclosed heat-producing equipment than known water storage cooling systems.

Still another object of the invention is to provide a passive cooling system which functions more efficiently and effectively, is of smaller size and dimensions and is less expensive in manufacture and operation than known water base thermosiphon passive cooling systems.

An object of the invention is to provide a passive cooling system utilizing energy storage rods for providing a great amount of cold storage in a small, compact volume.

Another object of the invention is to provide a passive cooling system which utilizes liquid FREON as a heat transfer fluid to cool enclosed heat-producing equipment thereby preventing damage to the equipment from leaking heat transfer fluid, since the FREON will vaporize in the event that it leaks into the enclosure.

Still another object of the invention is to provide a passive cooling system which is maintenance-free.

Yet another object of the invention is to provide an alternative totally integrated passive cooling package which can be installed on top of a roofless heat producing equipment enclosure either in the factory or at the site, rather than forming an integral part of the equipment enclosure.

BRIEF SUMMARY OF THE INVENTION

In accordance with the invention, a passive cooling system for cooling an enclosure having a top, comprises a cold bank tank for storing thermal energy in a very small area. The tank contains a liquid heat transfer fluid and has a top which is the top of the enclosure and a spaced opposite bottom. An inside heat exchanger extends from the bottom of the cold bank tank in the enclosure for cooling warm air in the enclosure rising by natural convection, returning the cooled air to the enclosure and transferring the warm air to the cold bank tank wherein it warms the heat transfer fluid in the tank. An outside heat exchanger outside the enclosure is spaced from the top of the enclosure and coupled to the cold bank tank. A plurality of energy storage rods in the heat transfer fluid in the cold bank tank store thermal energy in a very small area. The heat warming the heat transfer fluid is transferred to the energy storage rods and when the outside temperature decreases below a predetermined magnitude, heat is released from the energy storage rods to the liquid heat transfer fluid and vaporizes the fluid, the vaporized heat transfer fluid flows upward through vertical supporting piping, then through the outside heat exchanger, whence its heat is dissipated in the outside air, and the vapor is recondensed and returns by gravity to the tank via the vertical supporting pipes, thereby storing cold energy in the energy storage rods for release when the air in the enclosure is next warmed.

A plurality of thermoelectric cooling modules are positioned in the heat transfer fluid in the cold bank tank for supplementing passive cooling, if required due to extreme nighttime ambient temperatures.

The enclosure has spaced opposite sides. The energy storage rods have spaced opposite ends spaced from the spaced opposite sides. The thermoelectric cooling modules are positioned between the ends of the energy storage rods and the corresponding opposite sides of the enclosure in spaced relation with the energy storage rods and the top and sides of the enclosure.

The heat transfer fluid may be FREON or ammonia.

The energy storage rods are positioned in substantially parallel relation with each other and with the top of the enclosure.

The inside heat exchanger comprises an evaporator heat sink type exchanger having deep finned heat sinks affixed to the bottom of the cold bank tank for heat transfer from the enclosure and deep finned heat sinks immersed in the heat transfer fluid in the tank at the bottom of the tank for thermal conduction.

The deep finned heat sinks of the inside heat exchanger comprise extrude aluminum.

The outside heat exchanger comprises a fin tube heat exchanger condenser having an inverted substantially square U shaped finned tube with a pair of spaced substantially parallel arms extending substantially perpendicularly to the top of the enclosure through the top into the tank and a head extending between and joining the arms in spaced substantially parallel relation with the top of the enclosure.

In accordance with the invention, a passive cooling system for cooling an enclosure sheltering heat-producing equipment, the enclosure having a top and spaced opposite sides, comprises a cold bank tank for storing thermal energy in a very small area. The tank contains liquid FREON and has a top which is the top of the enclosure and a spaced opposite bottom. An inside heat exchanger extends from the bottom of the cold bank tank in the enclosure for cooling warm air produced by the equipment in the enclosure rising by natural convection, returning the cooled air to the equipment in the enclosure and transferring the warm air to the cold bank tank wherein it warms the FREON in the tank. The inside heat exchanger comprises an evaporator heat sink type heat exchanger having extruded aluminum deep finned heat sinks affixed to the bottom of the cold bank tank for heat transfer from the enclosure and deep finned heat sinks extending therefrom and immersed in the FREON in the tank at the bottom of the tank for thermal conduction. An outside heat exchanger outside the enclosure is spaced from the top of the enclosure and coupled to the cold bank tank. The outside heat exchanger comprises a fin tube heat exchanger condenser having an inverted substantially square U shaped finned tube with a pair of spaced substantially parallel arms extending substantially perpendicularly to the top of the enclosure through the top into the tank and a head extending between and joining the arms in spaced substantially parallel relation with the top of the enclosure. A plurality of energy storage rods are positioned in the FREON in the cold bank tank for storing thermal energy in a very small area. The energy storage rods are positioned in substantially parallel relation with each other and with the top of the enclosure. The energy storage rods have spaced opposite ends spaced from the spaced opposite sides of the enclosure. The heat warming the FREON is transferred to the energy storage rods and when the outside temperature decreases below a predetermined magnitude, heat is released from the energy storage rods to the liquid FREON and vaporizes the FREON, the vaporized FREON flows upward and through the outside heat exchanger whence its heat is dissipated in the outside air and the FREON vapor is recondensed and returns by gravity force to the tank thereby storing cold energy in the energy storage rods for release when the air in the enclosure is next warmed. A plurality of thermoelectric cooling modules in the Freon in the cold bank tank supplement passive cooling on nights when the outside nighttime temperature does not cool down sufficiently to permit the energy storage rods to change phase. The thermoelectric cooling modules are positioned between the ends of the energy storage rods and the corresponding opposite sides of the enclosure in spaced relation with the energy storage rods and the top and sides of the enclosure.

In an alternative arrangement, the cold bank tank, the inside heat exchanger and the outside heat exchanger are fully insulated and form an integral unit for mounting on an enclosure.

BRIEF DESCRIPTION OF THE DRAWINGS

In order that the invention may be readily carried into effect, it will now be described with reference to the accompanying drawing, wherein the single FIGURE is a schematic diagram, partly in section, of an embodiment of the passive cooling system of the invention.

DETAILED DESCRIPTION OF THE INVENTION

The passive cooling system of the invention cools an enclosure 1 sheltering heat-producing equipment 2 such as, for example, any type of electrical or electronic equipment such as radio equipment, a microwave repeater station, or the like. The enclosure 1 has a top 3 and spaced opposite sides 4 and 5.

The cooling system of the invention passively cools the interior of the enclosure 1 without the consumption of electrical energy in most applications. In areas of the world where the nighttime temperatures are very high, a plurality of solid state thermoelectric modules, hereinafter described, are used for a limited period of the night to supplement the passive cooling capacity. These sites are remote and unattended, so that the extremely high levels of efficiency, reliability and maintenance-free characteristics of the cooling system of the invention are important advantages.

The passive cooling system of the invention comprises three basic components; a heat exchanger 6 in the enclosure 1, a heat exchanger condenser 7 outside the enclosure and a cold bank thermal energy storage system 8, as hereinafter described.

The cold bank 8 includes a cold bank tank 9 for storing energy in a very small volume. The tank 9 contains a liquid heat transfer fluid 10, which is preferably liquid FREON, although it may be ammonia or other refrigerant. The heat transfer fluid 10 is preferably FREON, because the latent heat of absorption of FREON, when changing phase is considerably more efficient than water, when water is used as the heat transfer fluid in a thermosiphon type passive cooling system. Ammonia is even more efficient than FREON and has about three times the heat absorption capacity of an equal volume of FREON 11, but is toxic.

The cold bank tank 9 has a top which is the top 3 of the enclosure 1 and a spaced opposite bottom 11.

The inside heat exchanger 6 extends from the bottom 11 of the cold bank tank 9 in the enclosure 1 and functions to cool warm air, produced by the equipment 2, in the enclosure rising by natural convection. The inside heat exchanger 6 returns the cooled air to the equipment 2 in the enclosure 1 and tranfers the warm air to the cold bank tank 9, where it warms the heat transfer fluid 10 in said tank.

The inside heat exchanger 6 comprises an evaporator heat sink type heat exchanger having extruded aluminum deep finned heat sinks 12 affixed to the bottom 11 of the cold bank tank 9 for heat transfer from the enclosure 1 and deep finned sinks 13 extending from the heat sinks 12 and immersed in the heat transfer fluid 10 in said tank at said bottom of said tank for thermal conduction. The heat sinks 13 conduct thermal energy efficiently and prevent thermal stratification layers within the tank 9.

The evaporator heat sink 6 is bonded to the cold bank 8 and forms an integral part thereof. The heat exchanger 6 consists of four inch high extruded aluminum heat sinks 12 and 13 spaced about $\frac{3}{4}$ inch apart and covering the entire bottom 11 of the cold bank tank 9 on the surface in the enclosure as well as on the surface in said tank. The inside heat exchanger may comprise the Type 4559-G manufactured by EG & G's Wakefield Engineering Company.

The outside heat exchanger 7 is outside the enclosure 1, spaced from the top 3 of said enclosure, and is coupled to the cold bank tank 9. The outside heat exchanger 7 comprises a fin tube heat exchanger condenser having an inverted substantially square U shaped finned tube 14. The tube 14 has a pair of spaced substantially parallel arms 15 and 16 extending substantially perpendicularly to the top 3 of the enclosure 1, and through said top into the cold bank tank 9. The tube 14 also has a head 17 extending between, and joining, the arms 15 and 16 in spaced substantially parallel relation with the top 3 of the enclosure 1.

The outside heat exchanger condenser 7 may comprise any suitable known device for performing the described function. It is a conventional fin tube heat exchanger. The tube 14 is copper having an outer diameter of $\frac{3}{4}$ inch. The arms 15 and 16 of the tube 14 are copper having an outer diameter of $1\frac{1}{2}$ inches. There are preferably a plurality of heads 17, connected at their ends to common manifolds which are, in turn, connected to the arms 15 and 16.

A suitable fin tube heat exchanger is that manufactured by Edwards Engineering Corporation, 101 Alexander Avenue, Pompton Plains, N.J. 07444, and known as a Valence Heat Exchanger. This heat exchanger has six $\frac{3}{4}$ inch copper tubes connected in parallel by two headers or manifolds on opposite ends of the 72 inch length. Aluminum fins are attached across the six copper tubes to dissipate heat contained in the vaporized Freon in the copper tubes.

In accordance with the invention, efficient phase change energy storage rods are utilized to store large amounts of thermal energy in a very small volumetric area. A plurality of energy storage rods 18, 19, and so on, of which only two rods 18 and 19 are shown in the FIG., are provided in the heat transfer fluid 10 in the cold bank tank 9 for storing thermal energy in a very small area.

The energy storage rods 18, 19, and so on, are positioned in substantially parallel relation with each other and with the top 3 of the enclosure 1. The energy storage rods 18, 19, and so on, have spaced opposite ends 20, 21 and 22, 23, respectively, spaced from the spaced opposite sides 4 and 5 of the enclosure 1.

The cold bank 8 stores thermal energy very efficiently in a small area, since it uses the latent heat principle which permits a considerable amount of thermal energy to be stored in the energy storage rods 18, 19, and so on. The energy storage rods 18, 19, and so on, contain a eutectic salt solution and change phase at 81° F. and may comprise any suitable commercially available energy storage rods such as, for example, the "Thermol 81 Energy Storage Rod" of Pipe Systems, Inc. available from Texxor Corporation of Omaha, Nebr. and Pace Corp. of Appleton, Wis. The liquid FREON in the cold bank tank 9 functions as a highly efficient heat transfer fluid between the inside evaporator 6, the energy storage rods 18, 19, and so on, and the outside condenser 7.

Since heat is stored as latent heat of fusion in crystals which change phase at 81° F., they absorb 82 BTU per pound or 2460 BTU for each energy storage rod, which is $3\frac{1}{2}$ inches in diameter and 6 feet long. Because of the latent heat of fusion, large volumes of heat or cold may be stored in very small volumes. Thus, if it is assumed, for example, that the heat-producing equipment is a radio repeater having a radio which dissipates 500 watts inside the enclosure, this would be equivalent to 1706 BTUH. If it is further assumed that the daytime period is 11 hours, this is equivalent to 18,766 BTU total. To store 18,766 BTU in energy rods would require eight rods, since 18,766 BTU≈2460 BTU/rod=8. Each rod is 3.5 inches in diameter and 6 feet long, so that the eight rods side by side, including spaces between the rods for separation, would occupy 32 inches, for a total volume of 9,216 cubic inches or 5.4 cubic feet. By comparison, to store 18,766 BTU would require 500 gallons of water which would require a tank with a volume about five times larger than the volume of the energy storage rods.

Similarly, the inside heat exchanger 6, which is bonded to the bottom of the cold bank tank 9, is 4 inches in height and the inside heat fins are also 4 inches, so that this heat exchanger adds 8 additional inches to the 4 inches required, in height, for the energy rods, for a total of 12 inches in overall height by 32 inches wide by 6 feet long. In order to hold the equivalent amount of heat storage in water within the same size enclosure, for example, 32 inches wide by 6 feet long, the water tank would have to be 4½ feet in height. In addition, the enclosure's inside thermosiphon heat exchanger would add an additional 1½ feet in height, for a total of 6 feet in height, as compared to one foot for the cooling system of the invention.

Furthermore, the outside FREON heat exchanger 7 dissipates 902 BTUH with a 16° temperature differential for a total of 11,726 BTU over the 13 hour nighttime period. To dissipate a total of 18,766 BTU would require two of these heat exchangers. Somewhat less cooling capacity is obtained from each unit when there are two, since the overall efficiency drops slightly because of the reduction in the effective air temperature differential. Each of the two external heat exchangers is 6 feet long by 14½ inches wide by 2½ inches high. The two together, side by side, would occupy the same space requirements as the inside energy storage rods, for example, 32 inches wide by 6 feet long by 12 inches high, to provide 9½ inches of free air circulation below the heat exchanger. The external heat exchangers would also function as a solar roof, shading the top 3 of the enclosure 1 from heat gains by solar radiation.

Thus, the passive cooling system of the invention would occupy a total of 6 feet long by 32 inches wide by 2 feet in height, which is about the same size as an executive's desk, of which 12 inches is inside the enclosure 1 and 12 is outside the enclosure. By comparison, a water based thermosiphon system would occupy a space 6 feet long by 32 inches wide by 9 feet in height, which is about the same size as five stacked executive desks, of which 6 feet is inside the enclosure, plus 3 feet for the outside heat exchanger, or a difference in height of 7 feet.

The heat warming the liquid FREON 10 is transferred to the energy storage rods 18, 19, and so on, and when the outside temperature decreases below a predetermined magnitude, heat is released from said energy storage rods to said FREON and vaporizes said FREON. The vaporized FREON flows through the outside heat exchanger 7, whence its heat is dissipated in the outside air. The FREON vapor is recondensed by the condenser 7 and returns, by gravity force, to the cold bank tank 9. The cold energy is stored in the energy storage rods 18, 19, and so on, for release when the air in the enclosure is next warmed.

A plurality of thermoelectric cooling modules 24, 25, 26, 27, and so on, are provided in the heat transfer fluid 10 in the cold bank tank 9 and function to supplement passive cooling. The supplementing of passive cooling is required during the infrequent nighttime periods when the temperature remains high. The thermoelectric cooling modules 24, 25, 26, 27, and so on, are solid state components and may comprise any suitable cooling modules, which are commercially available. Thermoelectric cooling modules of suitable type are manufactured by Koolatron Industries Limited, 56 Harvester Avenue, Batavia, N.Y. 14020, and are known as Koolatron Miniaturized Thermoelectric Cooling Modules.

The thermoelectric cooling modules 24, 25, 26, 27, and so on, are positioned between the ends 20 and 22 of the energy storage rods 18, 19, and so on, and the side 4 of the enclosure 1, in spaced relation with said energy storage rods and the top 3 and side 4 of said enclosure, and between the ends 21 and 23 of said energy storage rods and the side 5 of said enclosure, in spaced relation with said energy storage rods and said top and side 5 of said enclosure.

The thermoelectric cooling modules 24, 25, 26, 27, and so on, are a multiplicity of solid state thermoelectric refrigeration modules immersed in the liquid FREON 10 in the cold bank tank 9 and supplement the passive cooling capacity during the infrequent nighttime periods when the ambient temperature does not drop sufficiently to cool the energy storage rods 18, 19, and so on. A liquid FREON thermostat (not shown in the FIG.) senses this condition and automatically passes electricity through the junction of the dissimilar metals in the thermoelectric modules. This causes heat to flow away from the junction. The heat is exhausted outside the enclosure 1 by means of a 3 inch diameter exhaust pipe (not shown in the FIG.), thereby cooling the liquid FREON 10 and storing cold energy in the energy storage rods 18, 19, and so on.

The thermoelectric cooling system utilizes very little power, 50 to 100 watts, and is absolutely reliable, since it does not require compressors or any of the other complex piping coils traditionally found in refrigeration units.

The thermoelectric solid state supplementary cooling modules are particularly useful in African type ambients, where the temperature differential between the day and nighttime periods is not as great as it is in a desert area, so that the modules therefore operate more frequently and for longer periods. Nevertheless, most of the time the thermoelectric cooling modules would not be operational, since the passive cooling system of the invention normally supplies sufficient cooling capacity.

The cooling system of the invention operates as follows. Heat dissipated from the equipment 2 rises and flows by natural convection across the heat sink fins 12 affixed to the bottom 11 of the cold bank tank 9, where the air is cooled and flows down across said equipment.

Warm enclosure air is transferred into the cold bank or thermal storage tank 9 by means of the outer and inner cold bank heat sinks 12 and 13, which in turn warm the liquid FREON 10 and transfer this heat into the energy storage phase change rods 18, 19, and so on, immersed in said liquid FREON. Because the energy storage phase change rods 18, 19, and so on, store latent heat at 81° F., very large quantities of heat may be stored during the hot daytime period in a very small area.

At night, when the outside temperature drops below 81° F., heat is released from the rods 18, 19, and so on, to the liquid FREON 10, which in turn vaporizes and flows upward through the tube arm 15 to the outside heat exchanger 7, where the heat is dissipated in the cooler nighttime air. The recondensed liquid FREON then flows by gravity down the tube arm 16. The returning chilled liquid FREON stores large amounts of cold energy in the energy storage rods 18, 19, and so on, for release during the following hot daytime period.

The passive cooling system of the invention may be built, as an alternative, as a fully integrated and insulated passive cooling package which may be mounted on a roofless equipment enclosure either in the factory or at the site.

While the invention has been described by means of a specific example and in a specific embodiment, I do not wish to be limited thereto, for obvious modifications will occur to those skilled in the art without departing from the spirit and scope of the invention.

I claim:

1. A passive cooling system for cooling an enclosure sheltering heat-producing equipment, said enclosure having a top and spaced opposite sides, said cooling system comprising a cold bank tank for storing thermal energy in a very small area, said tank containing liquid FREON and having a top which is the top of the enclosure and a spaced opposite bottom;

an inside heat exchanger extending from the bottom of said cold bank tank in said enclosure for cooling warm air produced by the equipment in said enclosure rising by natural convection, returning the cooled air to the equipment in the enclosure and transferring the warm air to said cold bank tank wherein it warms the FREON in said tank, said inside heat exchanger comprising an evaporator heat sink type heat exchanger having extruded aluminum deep finned heat sinks affixed to the bottom of said cold bank tank for heat transfer from said enclosure and deep finned heat sinks extending therefrom and immersed in said FREON in said tank at the bottom of said tank for thermal conduction and to prevent thermal stratification layers within the tank;

an outside heat exchanger outside said enclosure, spaced from the top of said enclosure and coupled to said cold bank tank, said outside heat exchanger comprising a fin tube heat exchanger condenser having an inverted substantially square U shaped finned tube with a pair of spaced substantially parallel arms extending substantially perpendicularly to the top of said enclosure through said top into said tank and a head extending between and joining said arms in spaced substantially parallel relation with said top of said enclosure;

a plurality of energy storage rods in said FREON in said cold bank tank for storing thermal energy in a very small area, said energy storage rods being positioned in substantially parallel relation with each other and with said top of said enclosure, said energy storage rods having spaced opposite ends spaced from the spaced opposite sides of said enclosure whereby the heat warming said FREON is transferred to said energy storage rods and when the outside temperature decreases below a predetermined magnitude, heat is released from said energy storage rods to said liquid FREON and vaporizes said FREON, the vaporized FREON flowing through the outside heat exchanger whence its heat is dissipated in the outside air and said FREON is recondensed and returns by gravity force to said tank thereby storing cold energy in said energy storage rods for release when the air in said enclosure is next warmed; and a plurality of thermoelectric cooling modules in said FREON in said cold bank tank for supplementing passive cooling, said thermoelectric cooling modules being positioned between the ends of said energy storage rods and the corresponding opposite sides of said enclosure in spaced relation with said energy storage rods and the top and sides of said enclosure.

2. A passive cooling system as claimed in claim 1, wherein said cold bank tank, said inside heat exchanger and said outside heat exchanger are fully insulated and form an integral unit for mounting on an enclosure.

3. A passive cooling system for cooling an enclosure having a top, said cooling system comprising a cold bank tank for storing thermal energy in a very small area, said tank containing a liquid heat transfer fluid and having a top which is the top of the enclosure and a spaced opposite bottom;

an inside heat exchanger extending from the bottom of said cold bank tank in said enclosure for cooling warm air in said enclosure rising by natural convection, returning the cooled air to the enclosure and transferring the warm air to said cold bank tank wherein it warms the heat transfer fluid in said tank, said inside heat exchanger comprising an evaporator heat sink type heat exchanger having deep finned heat sinks affixed to the bottom of said cold bank tank for heat transfer from said enclosure and deep finned heat sinks immersed in said heat transfer fluid in said tank at the bottom of said tank for thermal conduction and to prevent thermal stratification layers within said tank;

an outside heat exchanger outside said enclosure spaced from the top of said enclosure and coupled to said cold bank tank;

a plurality of energy storage rods in said heat transfer fluid in said cold bank tank for storing thermal energy in a very small area whereby the heat warming said heat transfer fluid is transferred to said energy storage rods and when the outside temperature decreases below a predetermined magnitude, heat is released from said energy storage rods to said liquid heat transfer fluid and vaporizes said fluid, the vaporized heat transfer fluid flowing through the outside heat exchanger whence its heat is dissipated in the outside air and said heat transfer fluid is recondensed and returns by gravity force to said tank thereby storing cold energy in said energy storage rods for release when the air in said enclosure is next warmed, said enclosure having spaced opposite sides and said energy storage rods having spaced opposite ends spaced from said spaced opposite sides; and a plurality of thermoelectric cooling modules in said heat transfer fluid in said cold bank tank for supplementing passive cooling, said thermoelectric cooling modules being positioned between the ends of said energy storage rods and the corresponding opposite sides of said enclosure in spaced relation with said energy storage rods and the top and sides of said enclosure.

* * * * *